No. 735,438. PATENTED AUG. 4, 1903.
A. H. ARMSTRONG.
METHOD OF CONTROLLING ALTERNATING CURRENT MOTORS.
APPLICATION FILED MAR. 2, 1899.
NO MODEL.
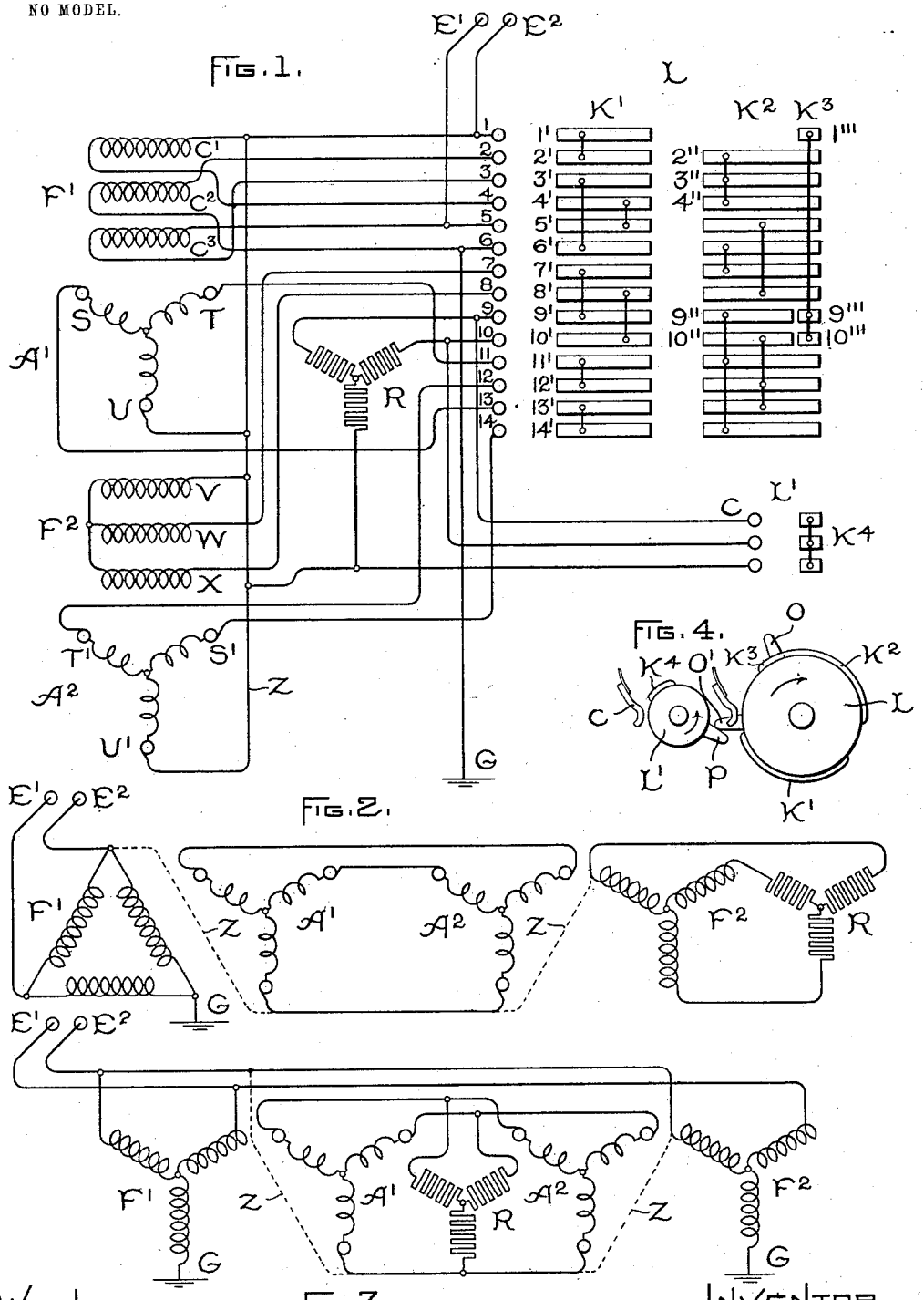
WITNESSES.
A. H. Abell.
Alexander S. ____
INVENTOR.
Albert H. Armstrong,
by Albert G. Davis
Atty.

No. 735,438. Patented August 4, 1903.

UNITED STATES PATENT OFFICE.

ALBERT H. ARMSTRONG, OF SCHENECTADY, NEW YORK, ASSIGNOR TO THE GENERAL ELECTRIC COMPANY, A CORPORATION OF NEW YORK.

METHOD OF CONTROLLING ALTERNATING-CURRENT MOTORS.

SPECIFICATION forming part of Letters Patent No. 735,438, dated August 4, 1903.

Application filed March 2, 1899. Serial No. 707,427. (No model.)

*To all whom it may concern:*

Be it known that I, ALBERT H. ARMSTRONG, a citizen of the United States, residing at Schenectady, county of Schenectady, State of New York, have invented certain new and useful Improvements in Methods of Controlling Alternating - Current Motors, of which the following is a specification.

My present invention, broadly speaking, relates to the control of alternating-current motors, and in some of its more limited aspects has more particular reference to the control of alternating-current induction-motors by the now well-known tandem multiple system.

I have discovered that the torque of an induction-motor with its inducing-coils connected in Y or gamma may be greatly increased by shifting the connections so as to change the winding to the closed or delta form. When the windings are connected with one terminal of each coil to a common point, commonly known as a "Y" or "gamma" connection, the electromotive force impressed on each coil bears the ratio of one-third to the electromotive force impressed on the individual coils when connected in delta. Since the torque on an induction-motor is proportional to the square of the impressed electromotive force, it follows that the operation of changing the windings of the motor from gamma to delta results in increasing the torque of the motor three times. I find the application of this principle useful in connection with the regulation of a single induction-motor, and it is also of particular value in connection with the control of induction-motors by the tandem multiple system. In the latter case when induction-motors operate in tandem I have found that their torque is reduced to a value materially lower than that which they would have were the motors connected in multiple and the same current flowing in each motor. The torque of the first motor is reduced because of the fact that its secondary is connected to a reactive circuit furnished by the primary of the second motor, while the torque of the second motor is reduced because of the diminished electromotive force impressed thereon from the secondary of the first motor. By connecting the inducing or primary winding of the first motor in delta when the motors are running in tandem the torque of the combination is increased three times, thus more than making up for the inherent lessening of the torque due to the tandem connection.

In addition to the broader features outlined above my invention includes certain minor details, all of which will be hereinafter described.

The scope of my invention both in its broader and its more limited aspects will be particularly pointed out in the appended claims.

Figure 1 is a diagram of the connections employed in carrying out my invention. Fig. 2 illustrates diagrammatically two induction-motors connected in tandem. Fig. 3 shows the motors connected in multiple, and Fig. 4 represents a detail.

In Fig. 1 is shown a developed view of the contacts on a controller-cylinder employed in changing the connections of induction-motors according to my invention. The contacts indicated collectively at $K'$ are those which correspond to the first controller position. The contacts indicated at $K^2$ correspond to the second controller position, while the contacts shown at $K^3$ represent the last or extreme position of the controller-cylinder. The contact-fingers operating in conjunction with these contacts are indicated by the numerals 1 to 14, inclusive. The controller thus briefly indicated is intended to be used in connection with two induction-motors, preferably of the three-phase type. The fixed members of the two motors are indicated at $F'$ and $F^2$ and are each provided with three coils. The movable members of the motors corresponding to the fixed members are shown at $A'$ and $A^2$. In describing my invention I prefer to designate the members of the motors in this manner rather than refer to them as inducing and induced members, because of the fact that in changing the connections of the motors from tandem to multiple, or vice versa, the members of one of the motors are reversed in character, thus giving a chance for ambiguity if the members of the motors be designated according to their electrical functions.

Suppose now that the controller is moved to its first position and that the contact-fingers 1 to 14 bear upon the corresponding contacts 1' to 14'. In this position of the controller the motors are connected in tandem, as shown in diagram in Fig. 2, the fixed member F' of the first motor having its coils connected in delta. The contacts 1' 2' connect together the coils C' C², the contacts 3' 6' the coils C² C³, and the contacts 4' 5' the coils C' C³. The windings on the fixed member of the first motor are thus connected in delta and receive current through the supply connections E', E², and G, as will readily be seen. The connections E' E² represent trolleys or contact-shoes, and the connection G the ground return or rails, of a three-phase railway system; but it will be evident that the invention while thus illustrated as applied to a railway system is in no sense limited thereto, but is equally available wherever it is desired to secure variations in speed and torque of induction-motors.

The contact-fingers 11, 12, 13, and 14, together with the corresponding contacts and cross connections on the controller-cylinder, act to connect two of the windings of the movable member A' with corresponding windings of the movable member A², the terminal T being connected to T' and the terminal S to S'. An electrical conductor Z permanently connects together the remaining terminals U U'. The two movable members of the motors are thus connected in series, the member A² acting as a primary for the secondary motor, while the member A' acts as a secondary for the first motor. The coils of the fixed member F² of the second motor are permanently connected with one terminal of each coil, with a common point, as indicated, and in the first controller position this winding is connected to the resistance R, the connections being as follows: One terminal V of the winding F² is permanently connected to the common conductor Z, to which one leg of the resistance R is also permanently connected. The contact-fingers 7 and 8, operating in conjunction with the corresponding contacts and cross connections on the controller-cylinder, serve to connect the two remaining terminals of the windings of the fixed member F² with the contact-fingers 9 10, which form the two remaining terminals of the resistance R.

From the diagram of connections shown in in Fig. 2 it will be seen that the second motor receives its energy from the movable or secondary member of the first and that for the purpose of increasing the starting torque of the combination a non-inductive resistance is shown as inserted in the induced or stationary member of the second motor.

The common conductor Z is indicated in Fig. 2 in dotted lines, and its object is to lessen the number of contact-fingers and contacts on the controller, the connections being made as far as possible between two sides of the three-phase conductors, the third conductor Z remaining unbroken. With the motors connected as shown the maximum starting torque is obtained by reason of the delta connection of the primary winding of the first motor and because of the non-inductive resistance in the secondary of the second motor. If the motors be geared to run at the same speed, they will reach a speed corresponding to one-half that which they would attain if connected individually to the supply-conductors. When this speed has been reached, the delta connection of the first motor may, if desired, be changed to gamma and the resistance R of the second motor short-circuited. I have not, however, considered it necessary to illustrate these minor details. In the second position K² of the controller the motors are connected in multiple, with the induced windings on the movable members closed-circuited upon the common resistance R. In this position of the controller the coils on each member of each motor are connected in gamma or Y, a mode of connection already explained, and clearly indicated in Fig. 3. Referring to the drawings, the contacts 2″ 3″ 4″ connect three terminals of the coils of the fixed member F' to a common point. The remaining terminals of these coils are connected directly to the supply-conductors E', E², and G. The coils of the fixed member F² of the second member are connected in parallel with the first, the coil V being connected through the common conductor Z with the supply-terminal E², the coil W to the supply connection G, and the remaining coil X with the terminal E'. The movable members A' A² of the motors are connected in multiple, the connections being reversed from those corresponding to the first controller position in order to preserve the same direction of rotation in the two motors. The coils U U' of the members A' A² are, as before, permanently connected together by the conductor Z, the remaining terminals, however, being reversed, the coil T being connected to the coil S' and the coil S to the coil T'. The resistance R has one of its terminals permanently connected to the conductor Z, and by consequence to the terminals U U', of the movable members A' A², while its remaining terminals are connected through the contact-fingers 9 10, and the corresponding controller contacts with the two remaining terminals of the windings of A' and A², thus being in parallel therewith. From the connections shown in Fig. 3 it will be seen that the motors are connected in multiple, with the windings of the fixed or primary member of the first motor connected in gamma rather than in delta, as in the first controller position. The object of this change of connections of the windings of the first motor has already been set forth. The connection of the motors in multiple operates to increase their speed, as is well understood.

The resistance in the secondaries of the motors reduces the speed at which the motors attain their maximum torque. This resistance is therefore chiefly useful while the motors are being gotten up to speed and is intended to be cut out as the speed rises in order to prevent waste of energy and to secure close speed regulation with varying load. The third controller position (indicated at K³) differs from the second controller position only in that the resistance R is short-circuited. The connections are obvious from the drawings. In this position, however, it should be stated that the contact-fingers 9 10 bridge over the spaces between the contacts 9″ 10″ and 9‴ 10‴, respectively.

When the controller is at the last controller position, large currents flow through the windings of the induced or movable members of the motors. If under these conditions the controller were to be moved back toward its original position, so as to cut out the short-circuiting connections of the resistance R, large and destructive arcs would be formed on the contacts 1‴ 9‴ 10‴, which arcs are difficult to blow out or extinguish, owing to the fact that they are formed by alternating currents and not by direct currents. In order to overcome this difficulty, I make use of a supplemental short-circuiting switch, the contacts of which are arranged on a small cylinder and adapted to be operated from the main controller-cylinder. Fig. 4 illustrates the coöperative relation between these two cylinders. The main controller-cylinder is indicated at L, and its contacts are shown at K′ K² K³. The supplemental cylinder is shown at L′ and is provided with contacts K⁴. Suitable controller-fingers operate, as shown, in conjunction with these contacts. The relative position of the parts shown corresponds to the off position of the controller. When the main controller is turned through its first and second positions, no movement is communicated to the short-circuiting cylinder L′. When, however, the main controller has been moved to its last position, the lug O on the main cylinder engages the lug P on the supplemental cylinder, thus causing the latter to turn until its contacts K⁴ are brought under the corresponding contact-fingers C, and so short-circuiting the resistance R. On the return movement of the controller the short-circuiting contacts on the main cylinder are withdrawn from beneath their coöperating contact-fingers without the production of arcs, owing to the fact that the short-circuiting cylinder L′ still remains with its contacts short-circuiting the resistance R. Just before the main cylinder has reached its off position and when the motors have been entirely disconnected from line the lug O′ on the main cylinder engages the lug P on the short-circuiting cylinder, causing the latter to rotate and open the short-circuiting contacts K⁴. It is obvious that under these conditions no arcing will be produced on the short-circuiting contacts. In some cases the short-circuiting contacts on the main controller-cylinder may be omitted, the supplemental short-circuiting switch being depended upon entirely for short-circuiting the resistance.

Although the system of control for induction-motors above described is particularly valuable in connection with railway-work, it will of course be obvious to any one skilled in the art that the various features which go to make up my invention are equally applicable whether the system be employed in connection with electric railway or for other purposes to which it may be adapted—as, for example, in electric hoisting, elevator-work, or the like.

Having thus described my invention, what I claim as new, and desire to secure by Letters Patent of the United States, is—

1. The method of controlling a plurality of induction-motors at least one of which has angularly-displaced windings on one of its members, which consists in connecting the motors in tandem and in multiple and connecting the said angularly-displaced windings either in closed circuit or with one terminal of each of said windings to a common point.

2. The method of controlling a plurality of induction-motors which consists in changing the connections of the motors from tandem to multiple or the reverse, connecting the windings of one of the motors in closed circuit when the motors are connected in tandem, and connecting one terminal of each of said windings to a common point when the motors are connected in multiple.

3. The method of controlling a plurality of induction-motors which consists in connecting the motors in tandem with the windings of one member of one of the motors arranged in closed circuit and connected to line, and then changing the aforesaid connection of said windings to one in which one terminal of each winding is connected to a common point.

4. The method of controlling a plurality of induction-motors which consists in connecting the motors in tandem, connecting the windings on one member of one of the motors to line, and varying the electromotive force impressed on the individual coils of said windings, independent of any variation of the electromotive force impressed on the terminals of the first motor of the series.

5. The method of controlling a plurality of induction-motors which consists in connecting the motors in tandem, then in multiple, and when in multiple connecting the induced windings to a resistance, then short-circuiting the resistance and maintaining the short circuit until the motors have been disconnected from line.

In witness whereof I have hereunto set my hand this 28th day of February, 1899.

ALBERT H. ARMSTRONG.

Witnesses:
BENJAMIN B. HULL,
MABEL H. EMERSON.